US006752631B2

(12) United States Patent
Schwarzkopf

(10) Patent No.: US 6,752,631 B2
(45) Date of Patent: Jun. 22, 2004

(54) TEACHING APPARATUS AND METHOD OF ENABLING USE OF KEYBOARD BY YOUNG CHILDREN

(76) Inventor: Dawn Marie Schwarzkopf, 1244 W. Lincoln Blvd., Freeport, IL (US) 61032

( * ) Notice: Subject to any disclaimer, the term of this patent is extended or adjusted under 35 U.S.C. 154(b) by 0 days.

(21) Appl. No.: 09/920,676

(22) Filed: Aug. 2, 2001

(65) Prior Publication Data

US 2002/0051957 A1 May 2, 2002

Related U.S. Application Data

(60) Provisional application No. 60/280,942, filed on Apr. 3, 2001.

(51) Int. Cl.[7] .............................................. G09B 13/00
(52) U.S. Cl. .................... 434/227; 400/472; 235/145 R
(58) Field of Search .................... 235/145 R; 434/227; D14/455; 400/472, 488–496

(56) References Cited

U.S. PATENT DOCUMENTS

| | | | | |
|---|---|---|---|---|
| 3,712,444 A | * | 1/1973 | Frost | 400/484 |
| 3,871,506 A | * | 3/1975 | Von Luders | 400/495 |
| 4,012,127 A | | 3/1977 | Bolander | 359/440 |
| 4,075,465 A | | 2/1978 | Funk et al. | 200/309 |
| D311,904 S | | 11/1990 | Solomon | D14/100 |
| 5,021,638 A | | 6/1991 | Nopper et al. | 200/302.2 |
| 5,314,337 A | | 5/1994 | Dixon | 434/227 |
| 5,531,529 A | | 7/1996 | Nusser | 400/472 |
| 5,911,317 A | | 6/1999 | Tsai | 200/314 |
| 6,033,822 A | | 3/2000 | Hasegawa et al. | 430/137.22 |
| 6,050,825 A | | 4/2000 | Nichol et al. | 235/145 R |

FOREIGN PATENT DOCUMENTS

| | | | | | |
|---|---|---|---|---|---|
| GB | 2152437 A | * | 8/1985 | | B51J/5/08 |
| GB | 2336570 A | * | 10/1999 | | B41J/5/10 |
| JP | 10083732 A | * | 3/1998 | | H01H/13/70 |
| WO | WO 9400809 A1 | * | 1/1994 | | G06F/3/02 |

OTHER PUBLICATIONS

Kohl, Louise, "Reading to the left", MacUSer, v4, p39 (1), Apr. 1988.*
Sales advertisement found on www.RussianSticker.com.*
Sales advertisement found on www.jewishsoftware.com.*
Education Technology News. v11, n14 Jul. 7, 1994.*
Kid Glove keyboard featured in ECT Eduactional Computing & Technology: Product Review: Dreamwriter IT, www.ect.hobsons.com.
Advertisement in Educational Resources, Fall 2000, p. 26, Reading Readiness Keyboard Cover, c–SKIN by SpeedSkin.

* cited by examiner

Primary Examiner—Derris H. Banks
Assistant Examiner—Dmitry Suhol
(74) Attorney, Agent, or Firm—Leydig, Voit & Mayer, Ltd.

(57) ABSTRACT

A teaching apparatus and method of enabling a child who does not have a complete mastery of a relationship between upper and lower letters to enter data into a computer is presented. In one embodiment, a computer keyboard overlay having lower-case letters is provided. The overlay is preferably transparent, and the lower-case letter is positioned in a non-interfering location relative to the upper-case letter on the alphabet keys such that both the upper-case and lower-case letters are visible to the child when installed. A computer keyboard is also presented that included both glyphs for upper-case and lower-case letters on the alphabet keys. The glyphs of the lower-case letters may be positioned on the keys directly, or may be applied along with a layer to the keys. A method comprises the step of providing a data entry device that displays both upper and lower case letters in association with one another.

17 Claims, 13 Drawing Sheets

TEACHING APPARATUS AND METHOD OF ENABLING USE OF KEYBOARD BY YOUNG CHILDREN

CROSS-REFERENCE TO RELATED PATENT APPLICATIONS

This patent application claims the benefit of U.S. provisional patent application No. 60/280,942, filed Apr. 3, 2001, the teachings and disclosure of which are hereby incorporated in their entirety by reference thereto.

FIELD OF THE INVENTION

The present invention relates generally to educational aids, and more particularly to computer-related educational aids that enhance familiarity with and ease of use of a computer for young children.

BACKGROUND OF THE INVENTION

The explosion of the Internet and the proliferation of personal computers confirms that the world is truly in the information age. Once only the tool for scientists in research facilities and universities, the personal computer of today may be found in nearly all businesses, most homes, and many schools and preschools. The early introduction, acceptance, and usage of these personal computers has led social psychologists to label the current generation as "Generation D" for digital. While many adults still find it difficult to stop 12:00 flashing on their home VCRs, kids of today have no problem downloading music, performing research projects, trading e-mails, chatting, etc. on personal computers more powerful than those that landed man on the Moon.

As more and more people utilize personal computers, parents and educators are recognizing the benefits that may be gained through early exposure and usage of these tools with younger and younger children. Indeed, many preschools, kindergartens, and first graders are now routinely being exposed to personal computers in the classroom and well as at home. Unfortunately, while the technology of the microprocessors that drive the computers has advanced significantly over the years, the primary user interface to the computer, the keyboard, has not changed in any significant way in more than a century and a quarter. Indeed, the current design of the QWERTY keyboard was first introduced in 1872 for the express purpose of making typing more difficult, and hence slower, for secretaries in companies. This was needed because of the original design of the typewriter that used long arms driven by the keys to place the type on the paper. If the succeeding letter was typed too quickly after the preceding letter, the arms for these two or more letters could, and often would, become jammed with one another. While digital computers no longer suffer from such a mechanical problem, the design of the present keyboard, which was meant to be difficult to use by experienced secretaries and typists in businesses, remains with us to this day.

Unfortunately, this carryover QWERTY keyboard design presents an additional problem to the early computer education of a child. However, this problem is much more subtle than commonly recognized problem presented by the non-alphabetical layout of the keys. This problem exists not because of the physical position of the keys, but because this carryover QWERTY design does not take into consideration the way that preschool through first grade students are taught reading, writing, and, more specifically, the alphabet. Most preschool and elementary school programs uniformly teach these young students lower case letters first. That is, a child's early exposure to the written word takes place in the realm of lower case letters, except for the beginning of their names, days of the week, etc. The QWERTY keyboard, quite to the contrary, displays all of the letters of the alphabet in upper case letters. As a result of the mismatch of the child's early education with lower case letters and the QWERTY keyboard's exclusive use of upper case letters, a child's early exposure to the personal computer can become quite confusing and frustrating. This confusion and frustration results with young children because they have not yet mastered the relationship between capital and lower case letters. Yet, they are asked to enter data that is given to them in lower case letters into the computer using the keys that display only upper case letters. For many an early leaner, the glyphs that make up the upper case letters are completely foreign to them.

As an example of this subtle, but nearly crippling problem, consider the operation of most educational software programs. To allow tracking of a child's performance, these programs typically require that a child first "log in" by typing his or her name. However, a student named "Sierra" would have a very difficult time finding the letters of her name on the QWERTY keyboard without a complete mastery of the relationship between upper case and lower case letters. That is, the student would need to type the keys displaying "SIERRA", even though most educators do not allow a child to write her name in this fashion. As such, the QWERTY keyboard has already undermined the educator's ability to teach the child the proper usage of letters to form her name, and has caused some level of dissonance in the child who knows that such usage is improper. However, the dissonance and confusion does not stop there. Once the student has found and typed the keys marked "SIERRA", she would look at the computer screen only to see her name displayed using the letters "sierra" because these young students do not have any knowledge of the shift key. This also causes confusion and dissonance in the child because she also knows that this is not the correct way to write her name.

This is a doubled headed problem resulting from the carryover design of the QWERTY keyboard. The student first struggles to find the letters (displayed as all upper case on the keys) he or she needs to log in to the educational program to begin the lesson, then looks up only to see his or her name is displayed differently (in all lower case letters) on the screen than what he or she just entered on the keyboard. This apparent disconnect between the data entry device of the keyboard and the data display device of the monitor is quite confusing for the early leaner. These students often become quite frustrated since they have not even logged in to the educational program, and yet they feel that they are already struggling to understand. This problem is further compounded because many of the early educational software packages also use lower case letters to teach early reading. However, when the program asks a student to find, e.g., the letter "j" it does not appear anywhere on the student's keyboard (however an adult readily recognizes that the "J" will properly satisfy the program's request).

Because the benefits of teaching lower case letters to early learners first, it would be foolish to suggest that the entire educational system will be changed to accommodate this problem resulting from the design of the QWERTY keyboard. Therefore, there exists a need for early learners in preschool, kindergarten, and early elementary school for a keyboard that takes into account an early learner's knowledge of letters. Also, since many school districts across the country have already purchased computer hardware, there exists a need in the art to virtually and apparently modify existing keyboards owned by the schools to aid the early learner in acquiring computer skills by reducing any unnecessary frustrations resulting from a keyboard that was originally designed to be used only by adults.

BRIEF SUMMARY OF THE INVENTION

In view of the above, an embodiment of the present invention presents a computer-related teaching apparatus for use with a computer keyboard and a computer comprising a keyboard overlay adapted to cover at least a portion of the computer keyboard. This keyboard overlay has a plurality of individual key-accommodating structures, each having at least a transparent upper surface to allow printed indicia on a key of the keyboard to be visible through the surface. Preferably, at least a portion of the transparent upper surfaces of the key-accommodating structures that correspond to alphabet keys of the keyboard has a lower-case letter positioned thereon in a non-interfering location relative to a position of the printed indicia on the alphabet key.

In one embodiment of the invention, the printed indicia on the alphabet keys of the keyboard is positioned in a first quadrant of the key, and the lower-case letter is positioned in a fourth quadrant of the transparent upper surface of the key-accommodating structures. Alternatively, the lower-case letter is positioned in a second quadrant of the transparent upper surface of the key-accommodating structures. As a further alternative, the lower-case letter is positioned in a third quadrant of the transparent upper surface of the key-accommodating structures.

In a preferred embodiment of the present invention, the teaching apparatus is used in an educational environment that uses a font style with which to teach children. In this embodiment the lower-case letters are rendered in that font style. In many preschools and elementary schools the font style used to teach the children is D'Nealian, and therefore the lower-case letters are rendered in D'Nealian. In other preschools and elementary schools the font style used to teach children is Zaner Bloser, and therefore the lower-case letters are rendered in Zaner Bloser.

In an embodiment of the present invention, the lower-case letter is positioned on an under surface of the transparent upper surface of the individual key-accommodating structure. Preferably, a transparent protective layer is attached to the under surface of the transparent upper surface of the individual key-accommodating structure such that the lower-case letter is positioned between the transparent upper surface and the transparent protective layer. In a preferred embodiment of the present invention, the keyboard overlay is adapted to cover a whole of the keyboard.

An alternate preferred embodiment of the present invention presents a computer-related teaching apparatus for use with young children who do not have a complete mastery of a relationship between upper-case and lower-case letters. This embodiment comprising a computer keyboard having a plurality of individual keys, at least a portion of the individual keys including a glyph of an upper-case letter and a glyph of an associated lower-case letter. In one embodiment, the glyph of an upper-case letter and the glyph of the lower-case letter are positioned in a horizontal relationship to one another in a plane of the keys. Alternatively, the glyph of an upper-case letter and the glyph of the lower-case letter are positioned in a diagonal relationship to one another in a plane of the keys. As a further alternative, the glyph of an upper-case letter and the glyph of the lower-case letter are positioned in a vertical relationship to one another in a plane of the keys.

In one embodiment of the present invention, the glyph of the upper-case letter is positioned on the keys, and the glyph of the lower-case letter is positioned on a layer that is overlaid on the keys. Preferably, the layer is adhesively applied on the individual keys. Alternatively, the layer is formed into a keyboard overlay having a plurality of individual key-accommodating structures having at least a transparent upper surface to allow the glyph of an upper-case letter on the keys to be visible. The glyph of a lower-case letter is positioned on the layer in a non-interfering location relative to the position of the glyph of the upper-case letter on the keys.

In an alternative embodiment of the present invention, a method of enabling a person who does not have a complete mastery of a relationship between upper-case and lower-case letters to enter data into a computer is presented. This method comprises the step of providing a data entry device that displays both upper and lower case letters in association with one another. In one embodiment, this step of providing a data entry device that displays both upper and lower case letters in association with one anther comprises the step of providing a computer keyboard, and a computer keyboard overlay having a plurality of individual key-accommodating structures. Preferably, each structure has at least a transparent upper surface to allow printed indicia on a key of the computer keyboard to be visible therethrough. At least a portion of the transparent upper surfaces of the key-accommodating structures that correspond to alphabet keys of the computer keyboard has a lower-case letter positioned thereon in a non-interfering location relative to a position of the printed indicia on the alphabet key.

In one embodiment of this method, the step of providing a data entry device that displays both upper and lower case letters in association with one another comprises the step of providing a computer keyboard having a plurality of individual keys, at least a portion of the individual keys including a glyph of an upper-case letter and a glyph of an associated lower-case letter. Alternatively, this step comprises the step of applying transparent stickers having a lower-case letter displayed thereon to associated alphabet keys of a computer keyboard in a position such that both upper and lower case letters are displayed. As a further alternative, this step comprises the step of providing a computer keyboard, and a computer keyboard overlay having a plurality of individual key-accommodating structures. Preferably, each structure associated with an alphabet key of the keyboard has an upper-case and a lower-case letter positioned thereon.

In an alternate embodiment of the present invention, a method of enabling a child who does not have a complete mastery of a relationship between upper-case and lower-case letters to enter data into a computer via a standard computer keyboard is presented. This method comprises the step of providing a keyboard overlay having a plurality of individual key-accommodating structures for accommodating at least a portion of the keys of the computer keyboard. Preferably, the keyboard overlay displays both upper and lower case letters in association with one another.

Other objectives, advantages, and embodiments of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
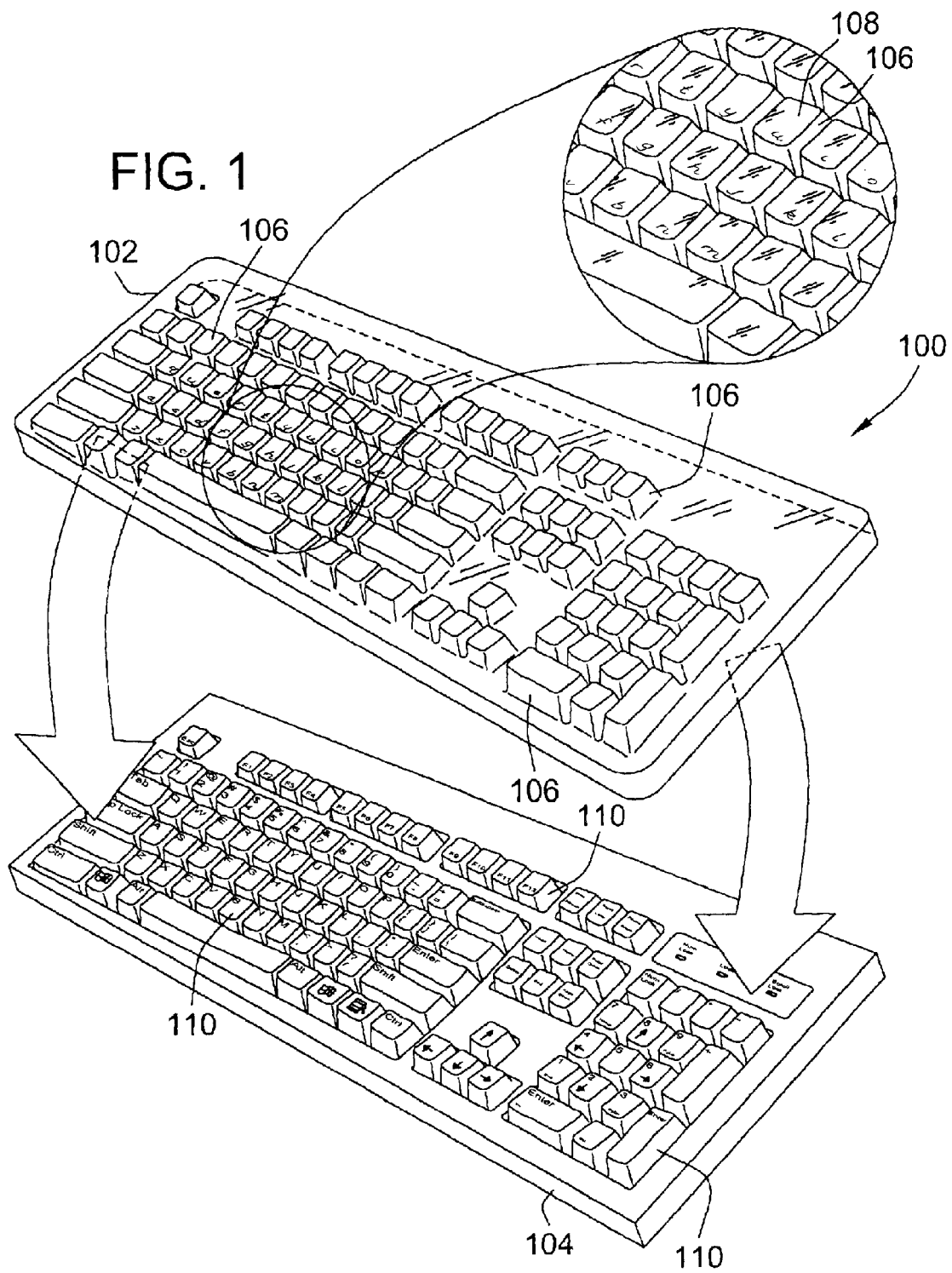
FIGS. 1a and 1b are an exploded isometric view and a partial enlarged view, respectively, of an embodiment of the teaching apparatus of the present invention.

Having recognized the source of much confusion and frustration experienced by young children first learning and using computers, that being the failure of the standard computer keyboard to display letters that may be recognized by these young children, a teaching apparatus is presented. One embodiment of such a teaching apparatus that enables these young children to enter data into a computer is illustrated in FIG. 1a. In this embodiment of the present invention, the teaching apparatus 100 takes the form of a computer keyboard overlay 102 that is adapted to cover at least a portion of the computer keyboard 104 used with a typical computer. As may be seen from this FIG. 1a, a preferred embodiment of the present invention utilizes a keyboard overlay 102 that covers the entire keyboard 104, including function and numeric keys 110 for which this problem does not exist. This keyboard overlay preferably includes a plurality of individual key accommodating structures 106. In a preferred embodiment, at least the top surface 108 of these key accommodating structures 106 is transparent to allow the indication on the individual keys 110 of the keyboard 104 to be visible through the overlay for perception by the user as may be seen in FIG. 1b. This keyboard overlay 102 is preferably fabricated from a thin flexible material as is well known in the art to allow for proper actuation of individual keys upon selection by a user. In the embodiment of the present invention illustrated in FIG. 1a, the entire keyboard overlay 102 is fabricated from a thin transparent material such that all indications and markings on the computer keyboard 104 may be visible therethrough.

Figure 2:
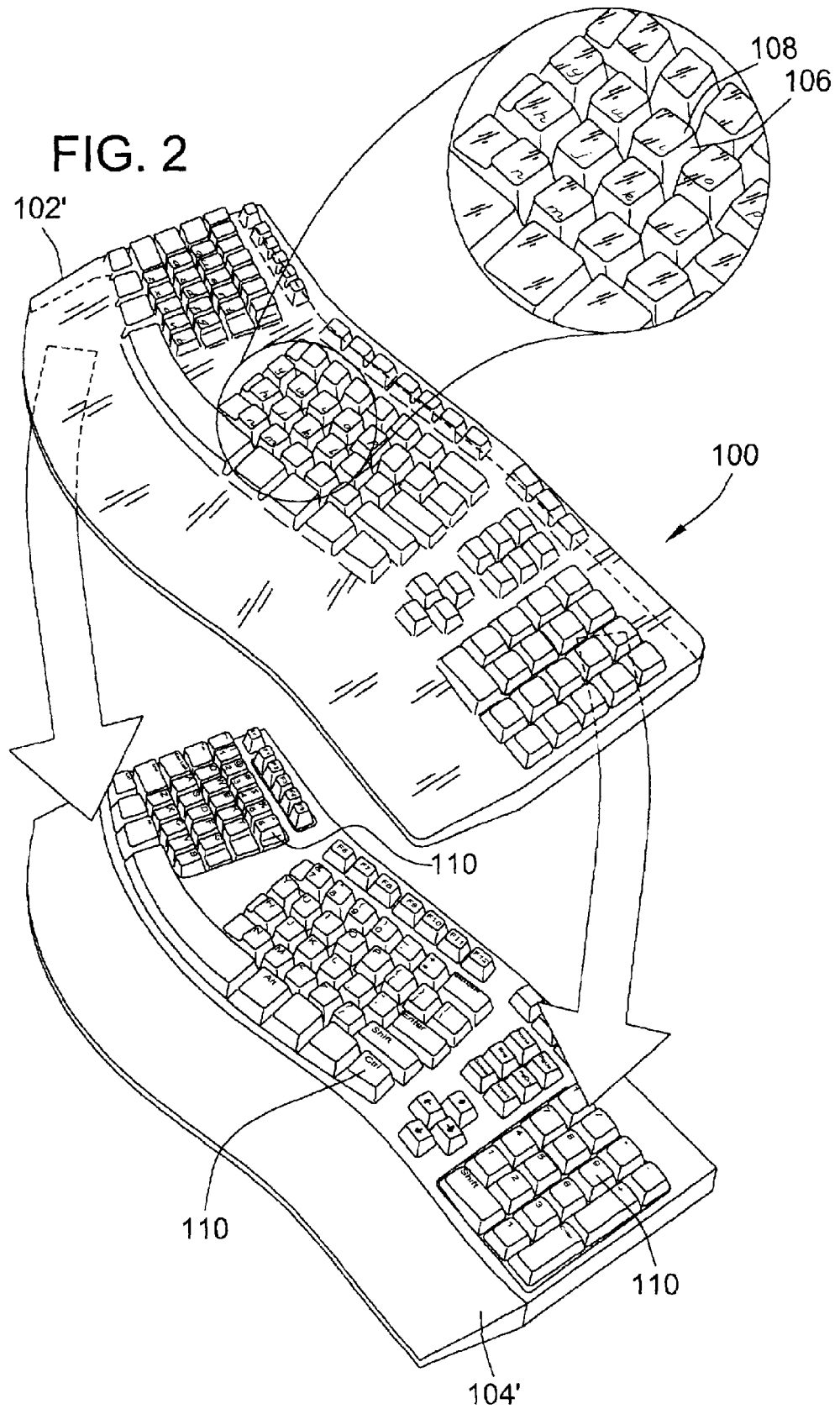
FIGS. 2a and 2b are an exploded isometric view and a partial enlarged view, respectively, of an alternate embodiment of the teaching apparatus of the present invention.

An alternate embodiment of the teaching apparatus of the present invention is illustrated in FIG. 2a for use with ergonomically designed computer keyboards 104'. As may be seen from FIG. 2b, the keyboard overlay 102' also includes a plurality of individual key accommodating structures 106 that are specifically designed to accommodate the keys of the ergonomic 104'. One skilled in the art will recognize that alternate constructions of the teaching apparatus 100 of the present invention may be made to fit keyboards of alternate constructions without departing from the scope or spirit of the present invention, and therefore are reserved herein. One skilled in the art will also recognize that, while the embodiments illustrated in FIG. 1a and FIG. 2a are shown as being transparent, or as having at least the top surface 108 of the individual key accommodating structures 106 being transparent, portions or the entirety of the keyboard overlay may be opaque. In such an embodiment preferably the information identifying each individual key will be included on the overlay such that a user may easily identify the individual keys. Of importance, the teaching apparatus of the present invention preferably displays both upper case and lower case letters in association with one another so that the education of the early learner may be further supported through the use of such an embodiment.

In embodiments of the present invention having at least the upper surface 108 of the key accommodating structures 106 being transparent, the placement of the glyph representing the individual lower case letter is of importance. While this glyph may simply be positioned on the upper surface 108 of the individual key accommodating structures 106 corresponding to the alphabet keys of keyboard 104, this surface is the contact surface with the users fingers during usage of the teaching apparatus. As such, placement of the lower case glyphs on the outer side of the upper surface 108 of the individual key accommodating structures 106 is not preferred. Instead, it is preferred that the placement of the glyph of the lower case letter be isolated from contact with the outer environment and user's fingers. Such may be accomplished by positioning the glyph on the underside of the upper surface 108 of the individual key accommodating structures 106. In this way, dirt and oil from the user's fingers may not act to wear away these lower case glyphs. However, it is recognized that even positioning these glyphs on the underside of the upper surface 108 may not totally prevent the wearing away of these glyphs. That is, the underside of the upper surface 108 of these individual key accommodating structures 106 are in direct contact with the individual keys 110 of keyboard 104. While such an environment is typically spared the excessive contamination resulting from continued and repeated contact with the users fingers, contact with the upper surface of the individual keys 110 of keyboard 104 may result in some undesirable contact with these glyphs.

Figure 3:
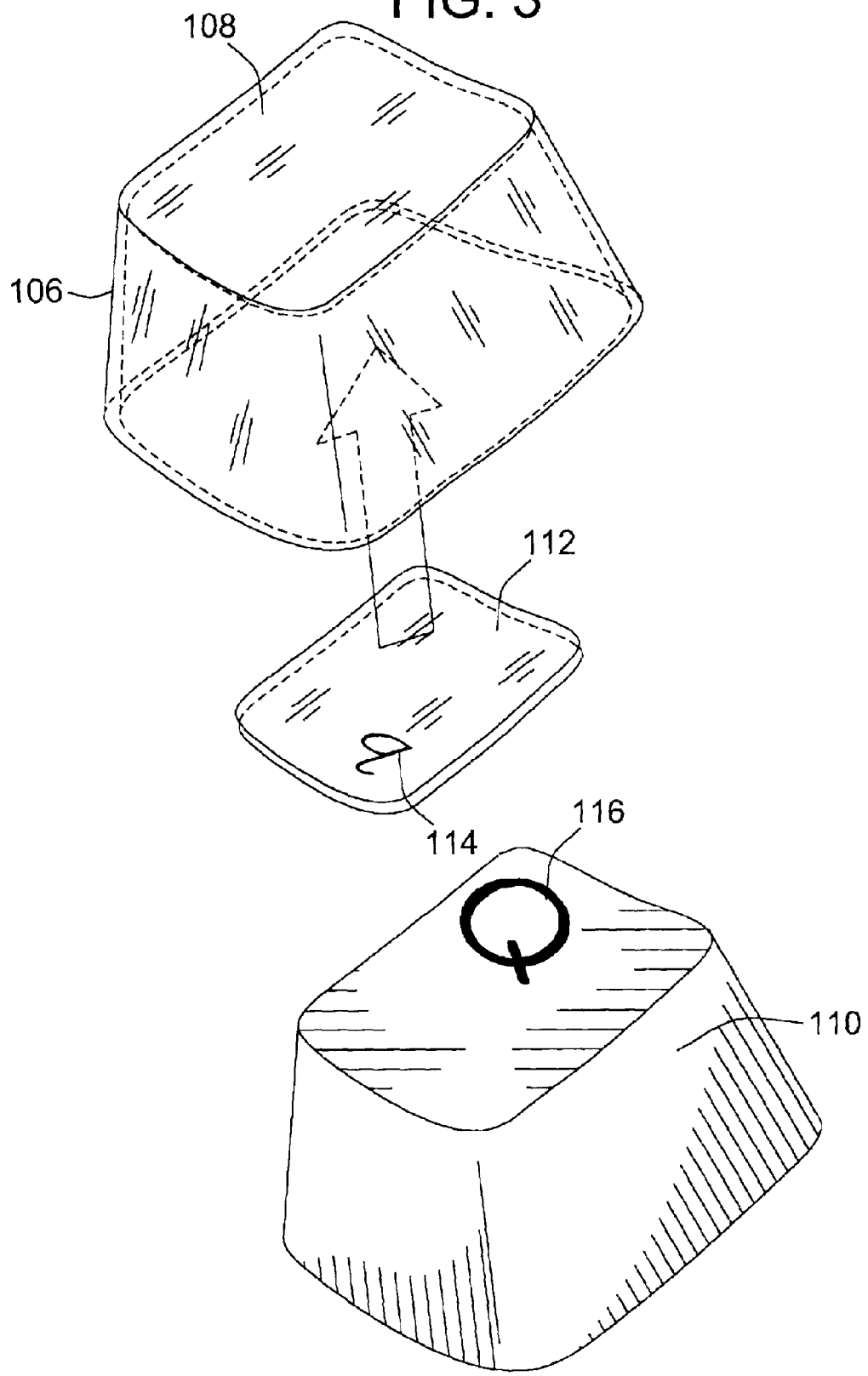
FIG. 3 is an exploded isometric view of a partial cut-away section of the embodiment of the present invention illustrated in FIG. 1 illustrating details of the construction of one embodiment of the present invention.

In a preferred embodiment to the present invention, therefore, an additional layer 112 may be used in association with the individual key accommodating structures 106 to protect the lower case glyphs from contact with the outside environment, the users fingers, and contact with individual keys 110 of the keyboard 104. Such a construction is illustrated in FIG. 3. In the embodiment illustrated in FIG. 3, the additional layer 112 is positioned on the underside of the upper surface 108 of the individual key accommodating structure 106. The lower case glyph 114 is positioned between the upper surface 108 and the additional layer 112 such that it is completely isolated from contact with the users fingers or the individual key 110 with which it is associated. This additional layer 112 is also preferably transparent to allow the upper case glyph 116 on the individual key 110 to be visible therethrough. This layer 112 is preferably bonded to the underside of surface 108. This bonding may be in the form of an adhesive, or may be bonded to the surface 108 through a heat treating or other appropriate process known in the art.

One skilled in the art will recognize that, while FIG. 3 illustrates the additional layer 112 being positioned on the underside of the surface 108, an alternative construction would be to bond this additional layer 112 on the outside of surface 108, provided that the lower case glyph 114 is again positioned between the layer 112 and the surface 108 so that it is protected from contact with the environment and the user's fingers. Likewise, one skilled in the art will also recognize that this surface 112 may be applied directly to the individual keys 110 of the keyboard without the rest of the structure of the overlay 102 being required. In such an embodiment, the lower case glyph is preferably positioned on the lower surface of layer 112 so that it is again protected by layer 112 from the environment. In such an embodiment, the size of the layer 112 preferably conforms to the upper surface of the individual key 110 such that the users fingers do not perceive a step change on the contact area of the individual keys 110. As discussed above, one skilled in the art will recognize that, while surface 112 is illustrated as being transparent, this surface 112 could be opaque and contain glyphs of both the upper and lower case letters in a manner such that they are visible to the user.

Figure 4:
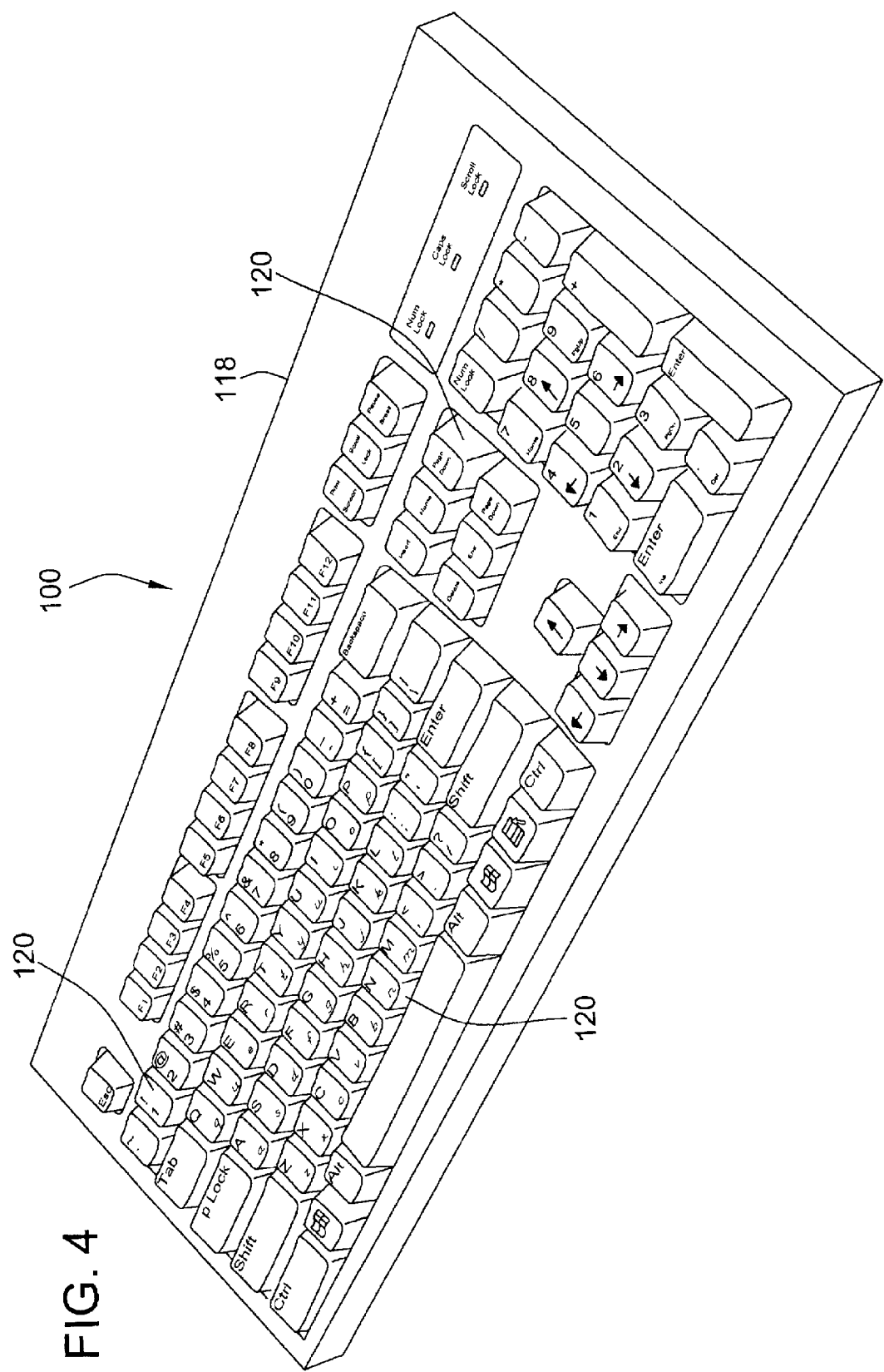
FIG. 4 is an isometric view of an alternate embodiment of a teaching apparatus constructed in accordance with the teachings of the present invention.

FIG. 4 illustrates an embodiment of the teaching apparatus 100 of the present invention. This apparatus 100 may be constructed as discussed above with regard to FIG. 1a from a standard keyboard 104 and a keyboard overlay 102. Alternatively, this embodiment of the teaching apparatus 100 may comprise a keyboard 118 having a plurality of individual keys 120, a portion of which include a glyph of an upper case letter and a glyph of an associate lower case letter thereon.

Figure 7:
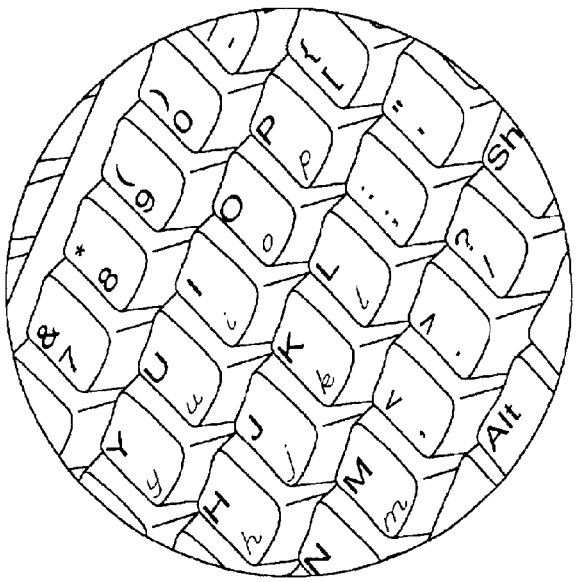
FIG. 7 is a partial isometric view of an embodiment of the teaching apparatus of the present invention highlighting yet another aspect thereof.
Figure 5:
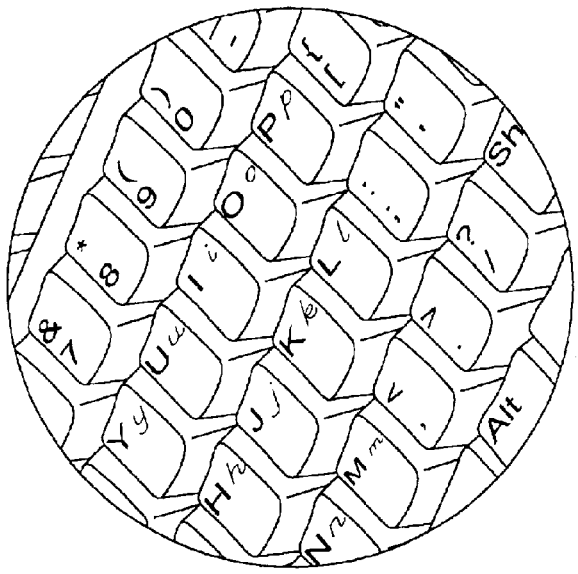
FIG. 5 is a partial isometric view of an embodiment of the teaching apparatus of the present invention highlighting one aspect thereof.

As may now be apparent from the proceeding description, the actual placement of the lower case glyphs in association with or on the individual keys 120 need be in a non-interfering location relative to the upper case glyph on each key. This relation between the positioning of the upper case and lower case letters on or associated with the individual alphabet keys of the keyboard may be better understood with reference to FIGS. 5–7. As may be seen from these three illustrations, the lower case glyph is positioned in a non-interfering location in a quadrant of the upper surface of the individual keys different than the quadrant in which the upper case glyph is positioned. In FIG. 5, the upper and lower case glyphs are displayed to the user in a side-by-side, or horizontal relation to one another within the plane of the keys. That is, using the standard graphical quadrant definition the upper case glyph is positioned in the first quadrant of the key while the lower case glyph is positioned in the second quadrant. In the embodiment illustrated in FIG. 6, the upper and lower case glyphs are positioned in a diagonal relation with respect to one another. Specifically, the upper case glyph is positioned in the first quadrant of the key while the lower case glyph is positioned in the third quadrant. FIG. 7 illustrates a vertical relation within the plane of the keys between the upper and lower case glyphs wherein the upper case glyph is positioned in the first quadrant of the key while the lower case glyph is positioned in the fourth quadrant.

Figure 6:
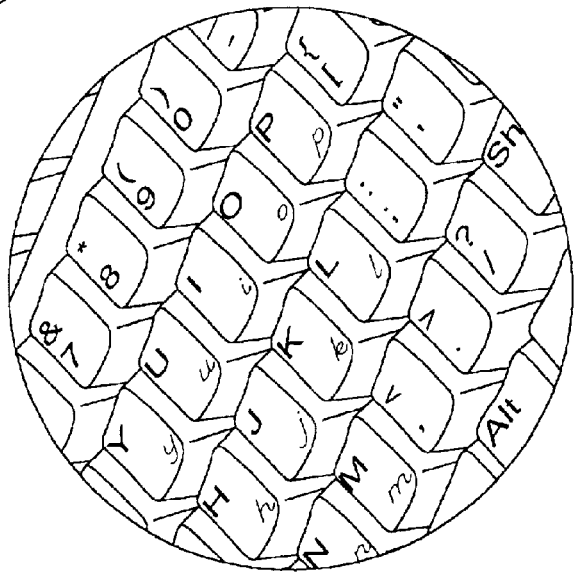
FIG. 6 is a partial isometric view of an embodiment of the teaching apparatus of the present invention highlighting another aspect thereof.

The embodiment illustrated in FIG. 7 follows the typical convention of placing the non-shifted character that will be displayed upon actuation of that key below the character that will be displayed when the shift key is actuated along with that individual key. This positioning of the lower case glyph, therefore, may well provide the most logical positioning of this lower case glyph so that a consistent rule for shifted and non-shifted characters may be taught to the students. However, the positioning of the lower case glyph as illustrated in FIG. 6 will allow for the positioning of a glyph having a larger point size on this surface without interfering with the glyph of the upper case letter. As such, such a positioning may well provide increased ease of use as the early students must hunt though all of the keys to find the desired letter. The positioning illustrated in FIG. 5 displays to the early learners the upper and lower case letters in association with one another in a manner similar to that which the students are taught when writing these letters. That is to say, the relative position of the upper and lower case letters, including portions of the glyphs that extend below the base line, further reinforce the proper positioning of these letters that these early learners are taught in their letter formation in writing class. As such, this positioning may well provide additional benefits that reinforce what the students have learned about proper letter positioning and the visual relationship between the upper and lower case letters.

Figure 8:
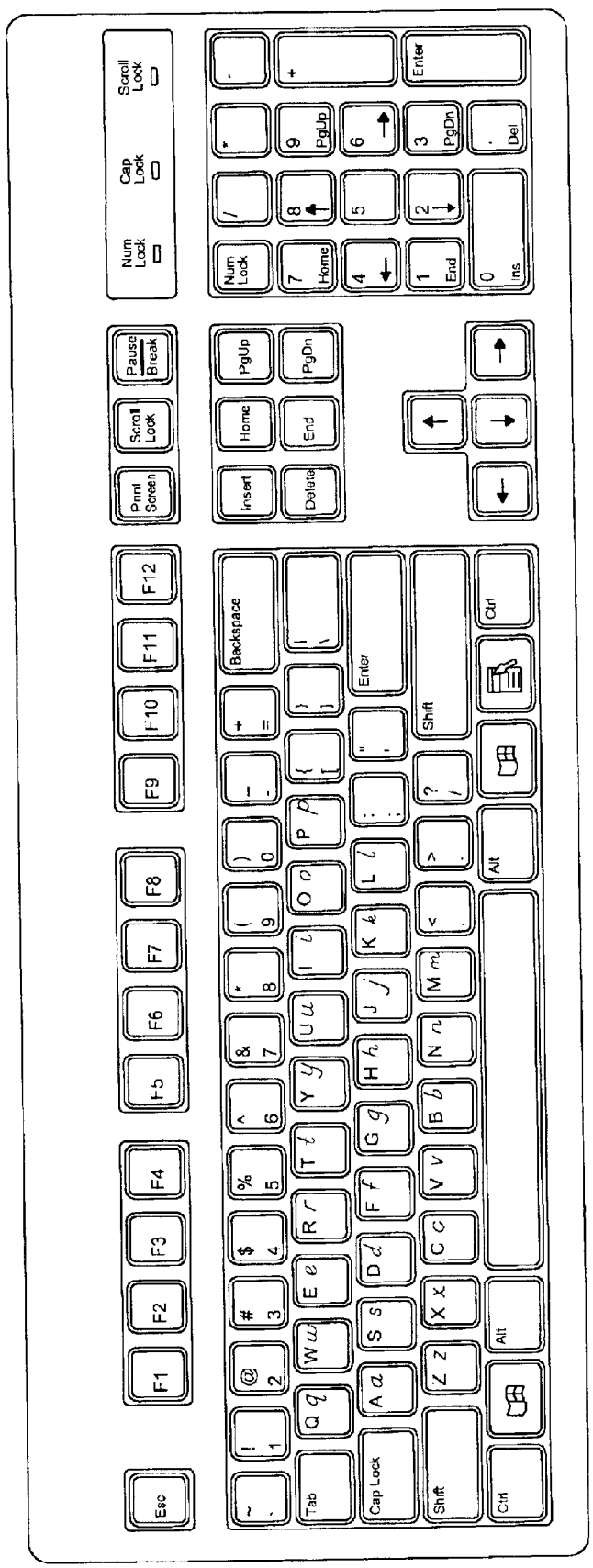
FIG. 8 is a top view illustration of a teaching apparatus constructed in accordance with the teachings of the present invention.
Figure 9:
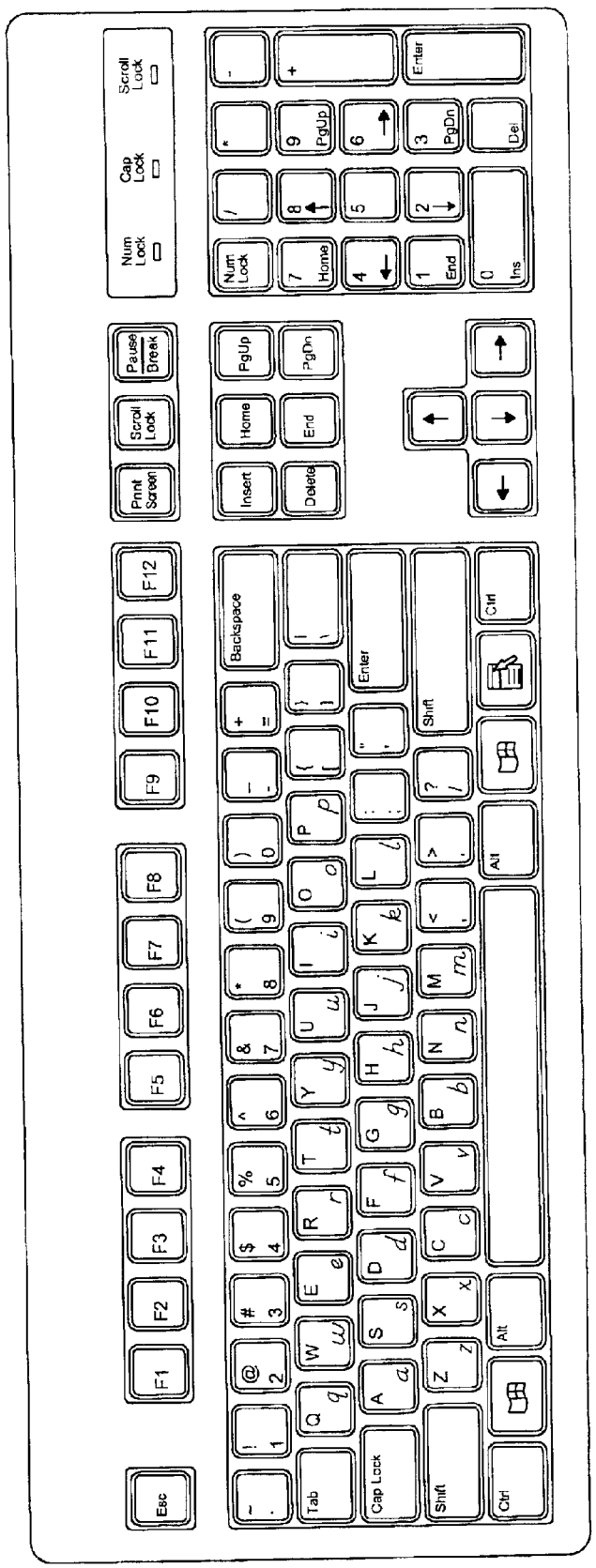
FIG. 9 is a top view illustration of an alternate embodiment of a teaching apparatus constructed in accordance with the teachings of the present invention.
Figure 10:
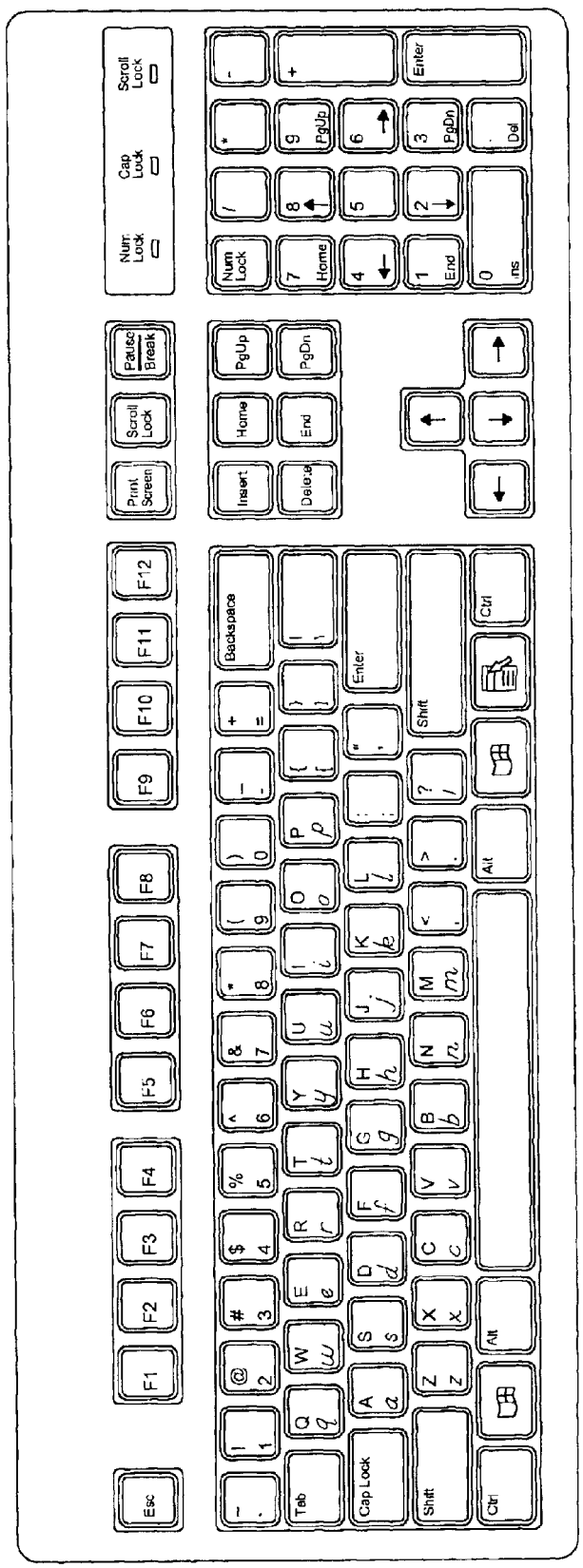
FIG. 10 is a top view illustration of a further embodiment of a teaching apparatus constructed in accordance with the teachings of the present invention.

FIGS. 8, 9 and 10 provide a top view illustration of a teaching apparatus constructed in accordance with the present invention utilizing the positioning of the lower case glyphs as discussed above with regard to FIGS. 5, 6, and 7, respectively.

Figure 11:
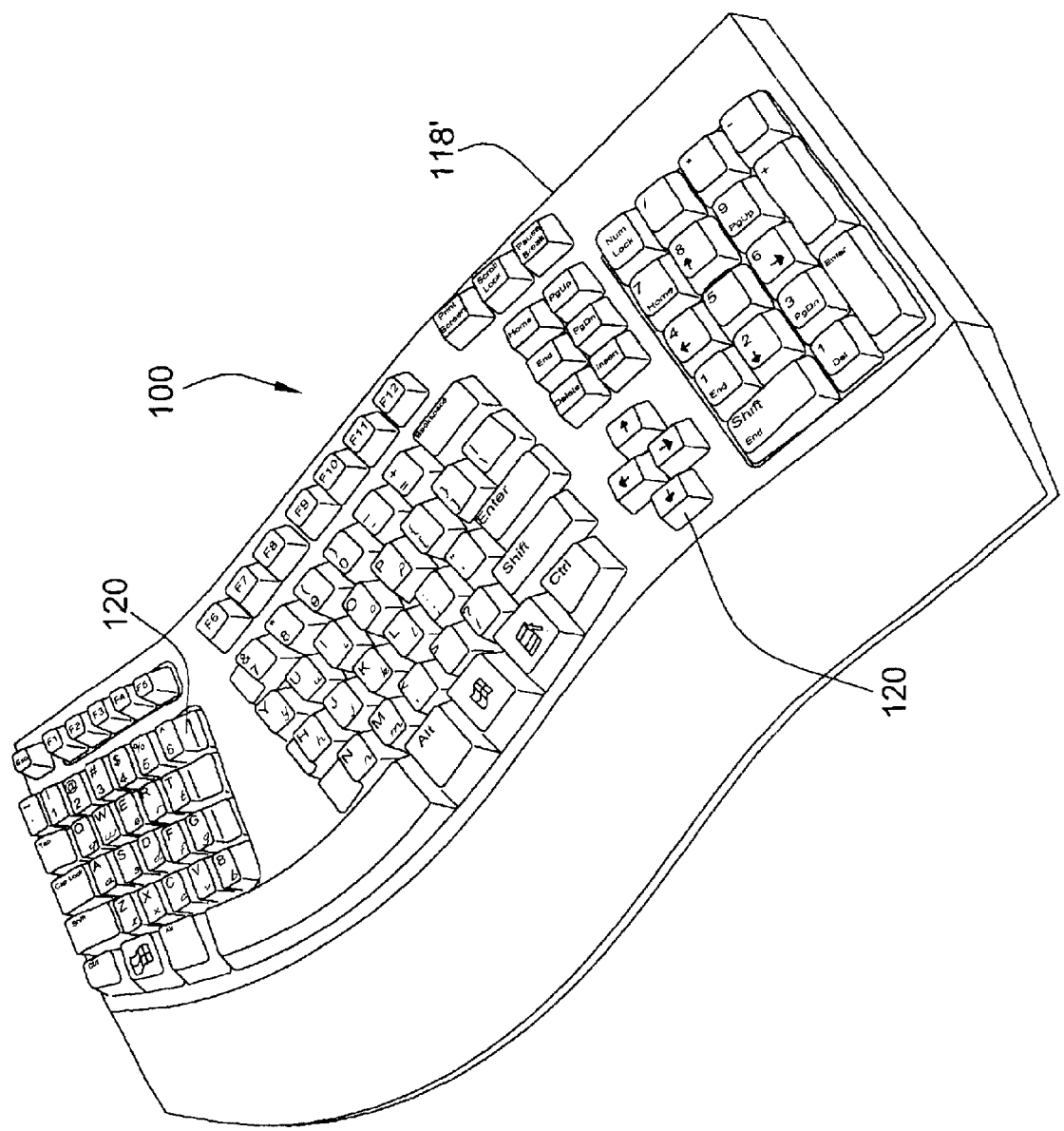
FIG. 11 is an isometric view of an alternate embodiment of a teaching apparatus constructed in accordance with the teachings of the present invention.

FIG. 11 illustrates an embodiment of the teaching apparatus 100 of the present invention. This apparatus 100 may be constructed as discussed above with regard to FIG. 2a from an ergonomic keyboard 104' and a keyboard overlay 102'. Alternatively, this embodiment of the teaching apparatus 100 may comprise a keyboard 118 having a plurality of individual keys 120, a portion of which include a glyph of an upper case letter and a glyph of an associate lower case letter thereon.

Figure 14:
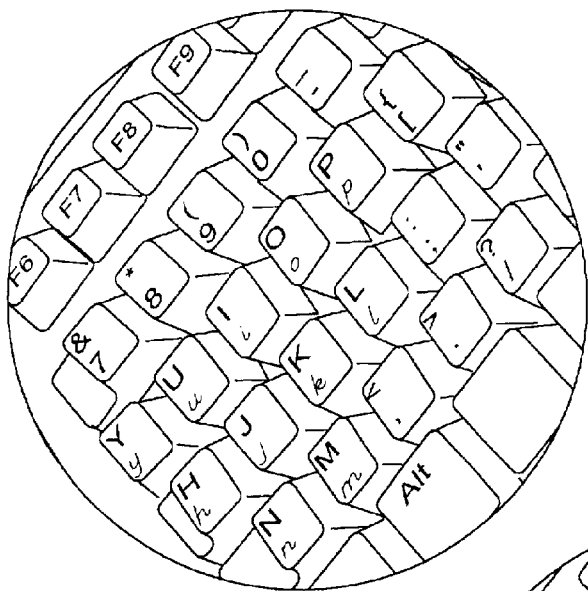
FIG. 14 is a partial isometric view of an embodiment of the teaching apparatus of the present invention highlighting yet another aspect thereof.
Figure 12:
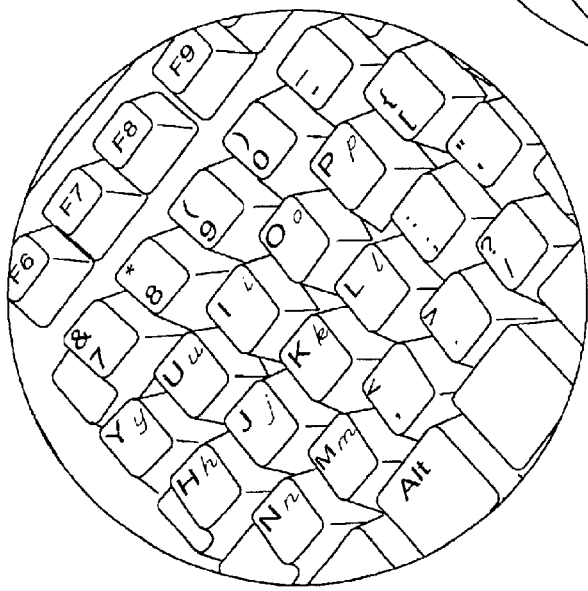
FIG. 12 is a partial isometric view of an embodiment of the teaching apparatus of the present invention highlighting one aspect thereof.

As may now be apparent from the proceeding description, the actual placement of the lower case glyphs in association with or on the individual keys 120 need be in a non-interfering location relative to the upper case glyph on each key. This relation between the positioning of the upper case and lower case letters on or associated with the individual alphabet keys of the keyboard may be better understood with reference to FIGS. 12–14. As may be seen from these three illustrations, the lower case glyph is positioned in a non-interfering location in a quadrant of the upper surface of the individual keys different than the quadrant in which the upper case glyph is positioned. In FIG. 12, the upper and lower case glyphs are displayed to the user in a side-by-side, or horizontal relation to one another within the plane of the keys. In the embodiment illustrated in FIG. 13, the upper and lower case glyphs are positioned in a diagonal relation with respect to one another, while FIG. 14 illustrates a vertical relation within the plane of the keys between the upper and lower case glyphs.

Figure 13:
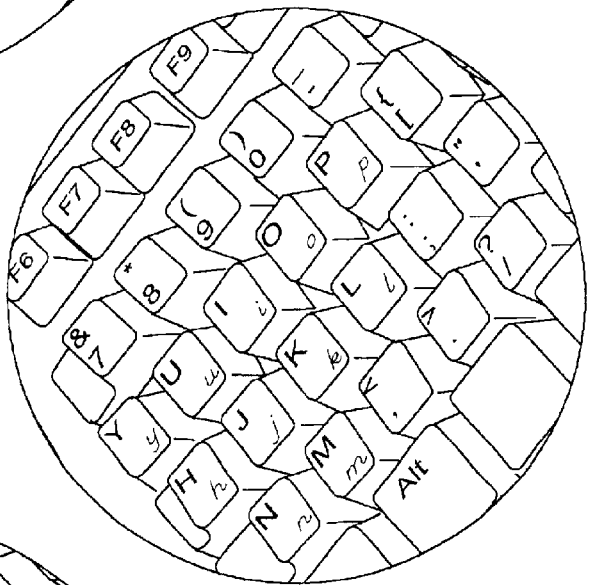
FIG. 13 is a partial isometric view of an embodiment of the teaching apparatus of the present invention highlighting another aspect thereof.

The embodiment illustrated in FIG. 14 follows the typical convention of placing the non-shifted character that will be displayed upon actuation of that key below the character that will be displayed when the shift key is actuated along with that individual key. This positioning of the lower case glyph, therefore, may well provide the most logical positioning of this lower case glyph so that a consistent rule for shifted and non-shifted characters may be taught to the students. However, the positioning of the lower case glyph as illustrated in FIG. 13 will allow for the positioning of the glyph having a larger point size on this surface without interfering with the glyph of the upper case letter. As such, such a positioning may well provide increased ease of use as the early students must hunt though all of the keys to find the desired letter. The positioning illustrated in FIG. 12 displays to the early learners the upper and lower case letters in association with one another in a manner similar to that which the students are taught when writing these letters. That is to say, the relative position of the upper and lower case letters, including portions of the glyphs that extend below the base line, further reinforce the proper positioning of these letters that these early learners are taught in their letter formation in writing class. As such, this positioning may well provide additional benefits that reinforce what the students have learned about proper letter positioning and the visual relationship between the upper and lower case letters.

Figure 15:
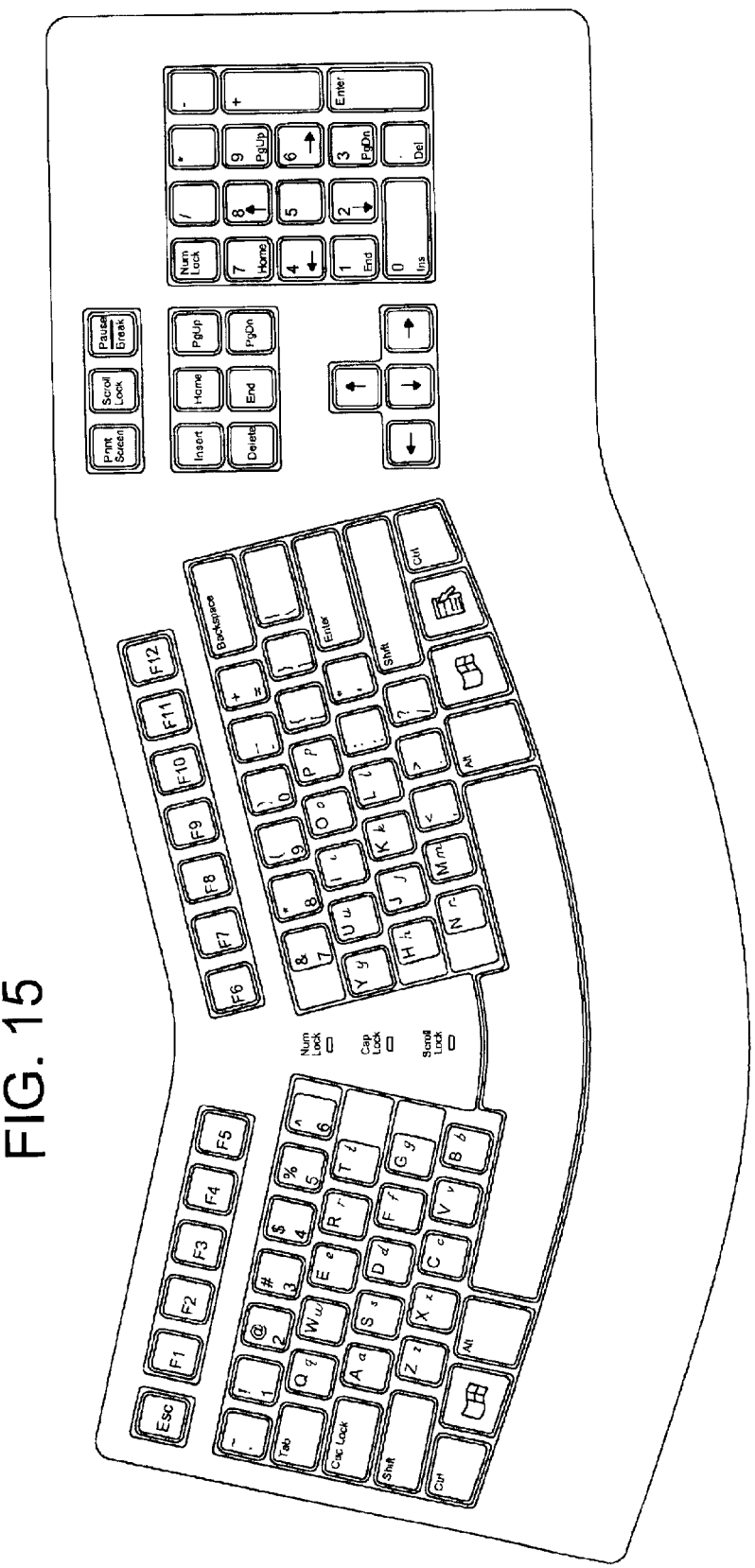
FIG. 15 is a top view illustration of an alternate embodiment of a teaching apparatus constructed in accordance with the teachings of the present invention.
Figure 16:
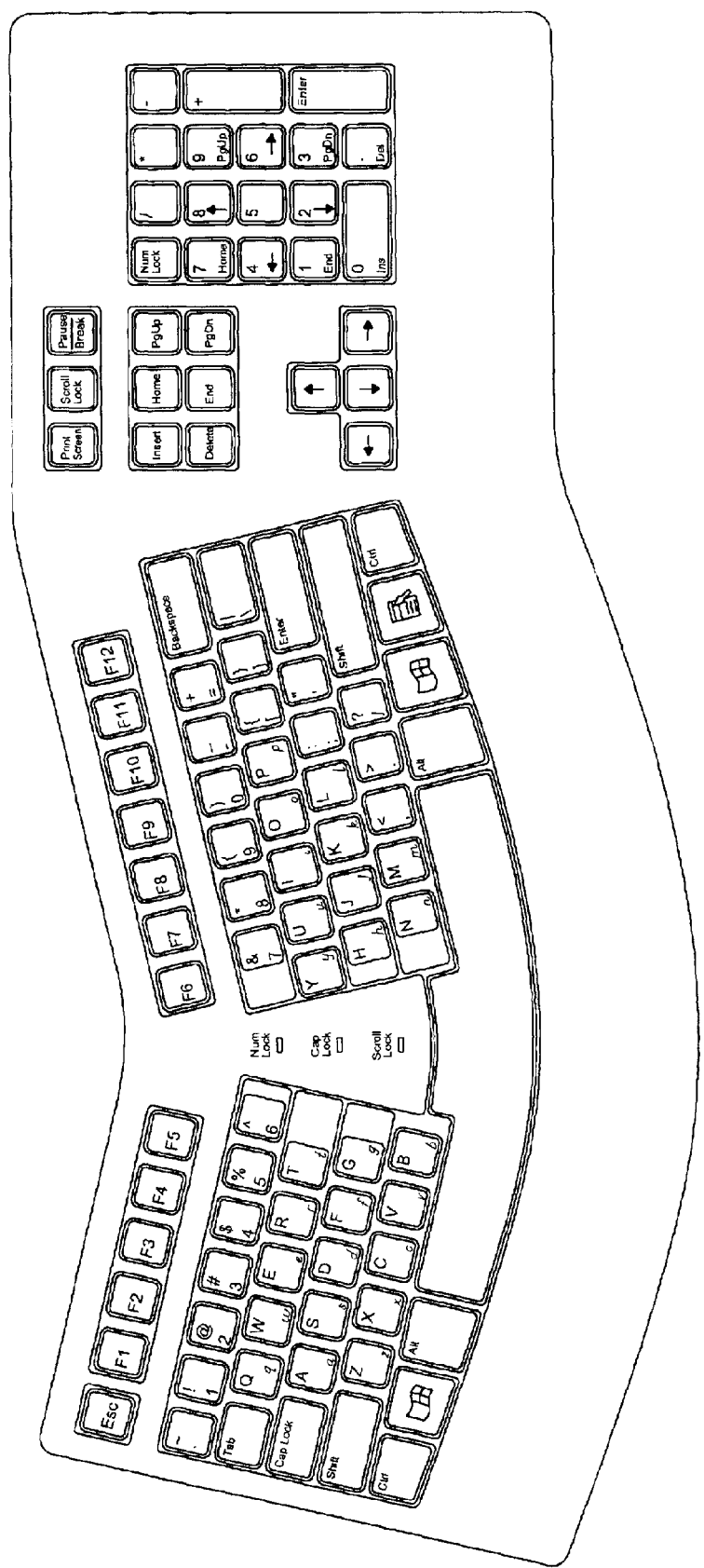
FIG. 16 is a top view illustration of a further embodiment of a teaching apparatus constructed in accordance with the teachings of the present invention.
Figure 17:
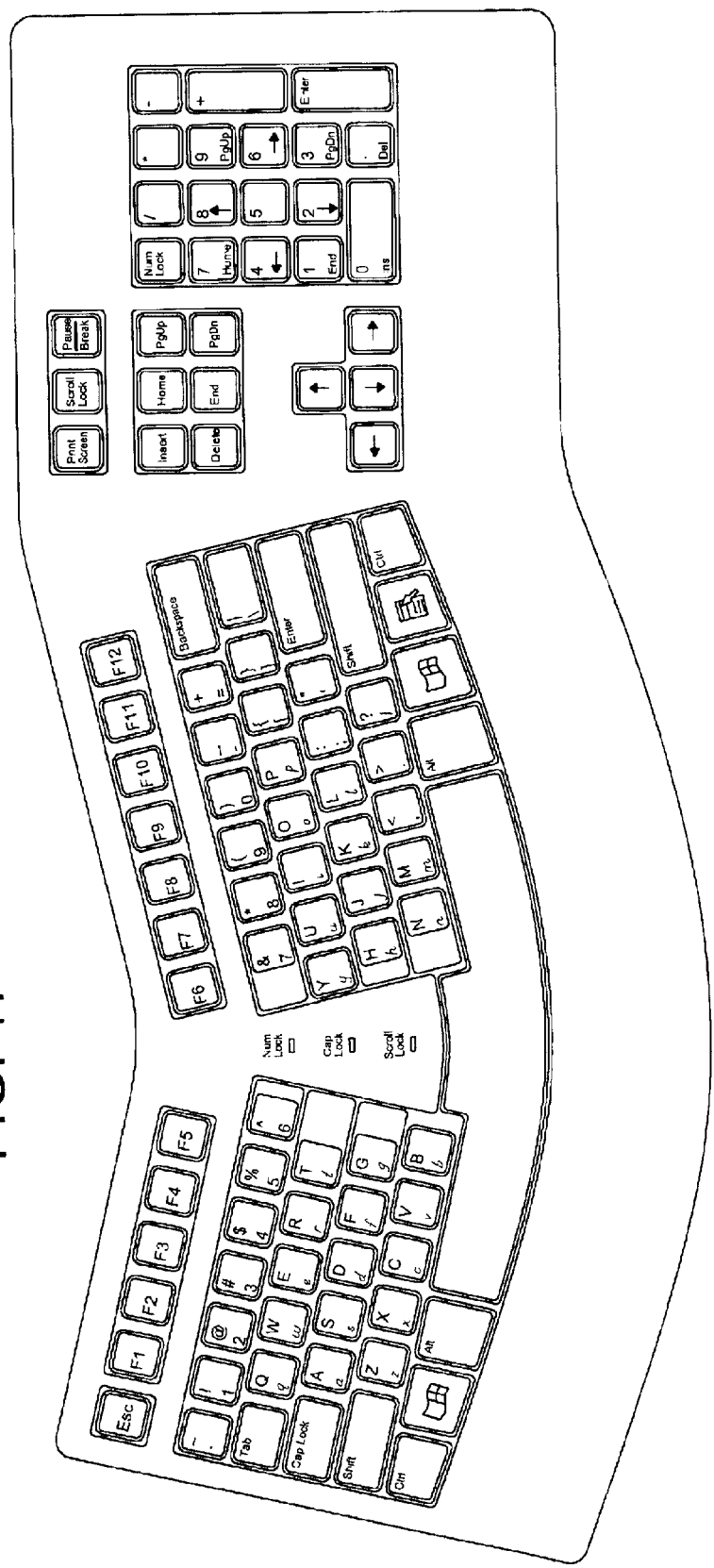
FIG. 17 is a top view illustration of a further alternate embodiment of a teaching apparatus constructed in accordance with the teachings of the present invention.

FIGS. 15, 16 and 17 provide a top view illustration of a teaching apparatus constructed in accordance with the present invention utilizing the positioning of the lower case glyphs as discussed above with regard to FIGS. 12, 13, and 14, respectively.

In addition to the positioning of the font, the type of font may also provide benefits to the early learner. In many school districts and preschools, the font with which the children are taught for both reading and writing is know as D'Nealian which appears as follows: a b c de f g hi j k lm n o pq r s t x y z. Other districts and preschools use a font known as Zaner Bloser or manuscript which appears as follows: a b c de f g hi j k lm n o pq r s tu v wx y z. Other fonts may be utilized by other schools, and preferably these same fonts are used in an embodiment of the present invention to fully integrate and reinforce the child's early learning. Preferably, fonts that have curvy glyphs for letters such as a, g, and t are avoided. However, the use of nearly any font displaying lower-case letters will aid a child and more easily enable that child to enter data into a computer than having to use only the upper-case letters provided on standard keyboards.

All of the references cited herein, including patents, patent applications, and publications, are hereby incorporated in their entireties by reference.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A computer-related teaching apparatus for use with a computer keyboard and a computer, comprising a keyboard overlay adapted to cover at least a portion of the computer keyboard, said keyboard overlay having a plurality of individual key-accommodating structures, each said structure having at least a transparent upper surface to allow printed indicia on a key of the keyboard to be visible therethrough, and at least a portion of said transparent upper surfaces of said key-accommodating structures that correspond to alphabet keys of the keyboard having a lower-case letter positioned thereon in a non-interfering location relative to a position of the printed indicia on the alphabet key.

2. The teaching apparatus of claim 1, wherein the printed indicia on the alphabet keys of the keyboard is positioned in a first quadrant of the key, and wherein said lower-case letter is positioned in a fourth quadrant of said transparent upper surface of said key-accommodating structures.

3. The teaching apparatus of claim 1, wherein the printed indicia on the alphabet keys of the keyboard is positioned in a first quadrant of the key, and wherein said lower-case letter is positioned in a second quadrant of said transparent upper surface of said key-accommodating structures.

4. The teaching apparatus of claim 1, wherein the printed indicia on the alphabet keys of the keyboard is positioned in a first quadrant of the key, and wherein said lower-case letter is positioned in a third quadrant of said transparent upper surface of said key-accommodating structures.

5. The teaching apparatus of claim 1 for use in an educational environment utilizing a first font style with which to teach children, wherein said lower-case letters are rendered in said first font style.

6. The teaching apparatus of claim 5, wherein said first font style is D'Nealian.

7. The teaching apparatus of claim 5, wherein said first font style is Zaner Bloser.

8. The teaching apparatus of claim 1, wherein said lower-case letter is positioned on an under surface of said transparent upper surface of said individual key-accommodating structure.

9. The teaching apparatus of claim 8, further comprising a transparent protective layer attached to said under surface of said transparent upper surface of said individual key-accommodating structure such that said lower-case letter is positioned between said transparent upper surface and said transparent protective layer.

10. The teaching apparatus of claim 1, wherein said keyboard overlay is adapted to cover a whole of the keyboard.

11. A computer-related teaching apparatus for use with young children who do not have a complete mastery of a relationship between upper-case and lower-case letters, comprising a computer keyboard having a plurality of individual keys, at least a portion of said individual keys including a glyph of an upper-case letter and a glyph of an associated lower-case letter, wherein said glyph of said upper-case letter is positioned on said keys, and wherein said glyph of said lower-case letter is positioned on a transparent layer that is overlaid on the keys such that both the upper-case letter and the lower-case letter are visible without interfering with one another.

12. The teaching apparatus of claim 11, wherein said glyph of an upper-case letter and said glyph of said lower-case letter are positioned in a horizontal relationship to one another in a plane of said keys.

13. The teaching apparatus of claim 11, wherein said glyph of an upper-case letter and said glyph of said lower-case letter are positioned in a diagonal relationship to one another in a plane of said keys.

14. The teaching apparatus of claim 11, wherein said glyph of an upper-case letter and said glyph of said lower-case letter are positioned in a vertical relationship to one another in a plane of said keys.

15. The teaching apparatus of claim 11, wherein said layer is adhesively attached on individual keys.

16. The teaching apparatus of claim 11, wherein said layer is formed into a keyboard overlay having a plurality of individual key-accommodating structures, each structure having at least a transparent upper surface to allow said glyph of an upper-case letter on said keys to be visible therethrough, said glyph of a lower-case letter positioned thereon in a non-interfering location relative to a position of said glyph of an upper-case letter on the keys.

17. A method of enabling a person who does not have complete mastery of a relationship between upper-case and lower-case letters to enter data into a computer, comprising the step of providing a data entry device that displays both upper and lower case letters in association with one another wherein the step of providing a data entry device that displays both upper and lower case letters in association with one another comprises the step of providing a computer keyboard, and a computer keyboard overlay having a plurality of individual key-accommodating structures, each structure having at least a transparent upper surface to allow printed indicia on a key of the computer keyboard to be visible therethrough, and at least a portion of said transparent upper surfaces of the key-accommodating structures that correspond to alphabet keys of the computer keyboard having a lower-case letter positioned thereon in a non-interfering location relative to a position of the printed indicia on the alphabet key.

* * * * *